No. 784,570. Patented March 14, 1905.

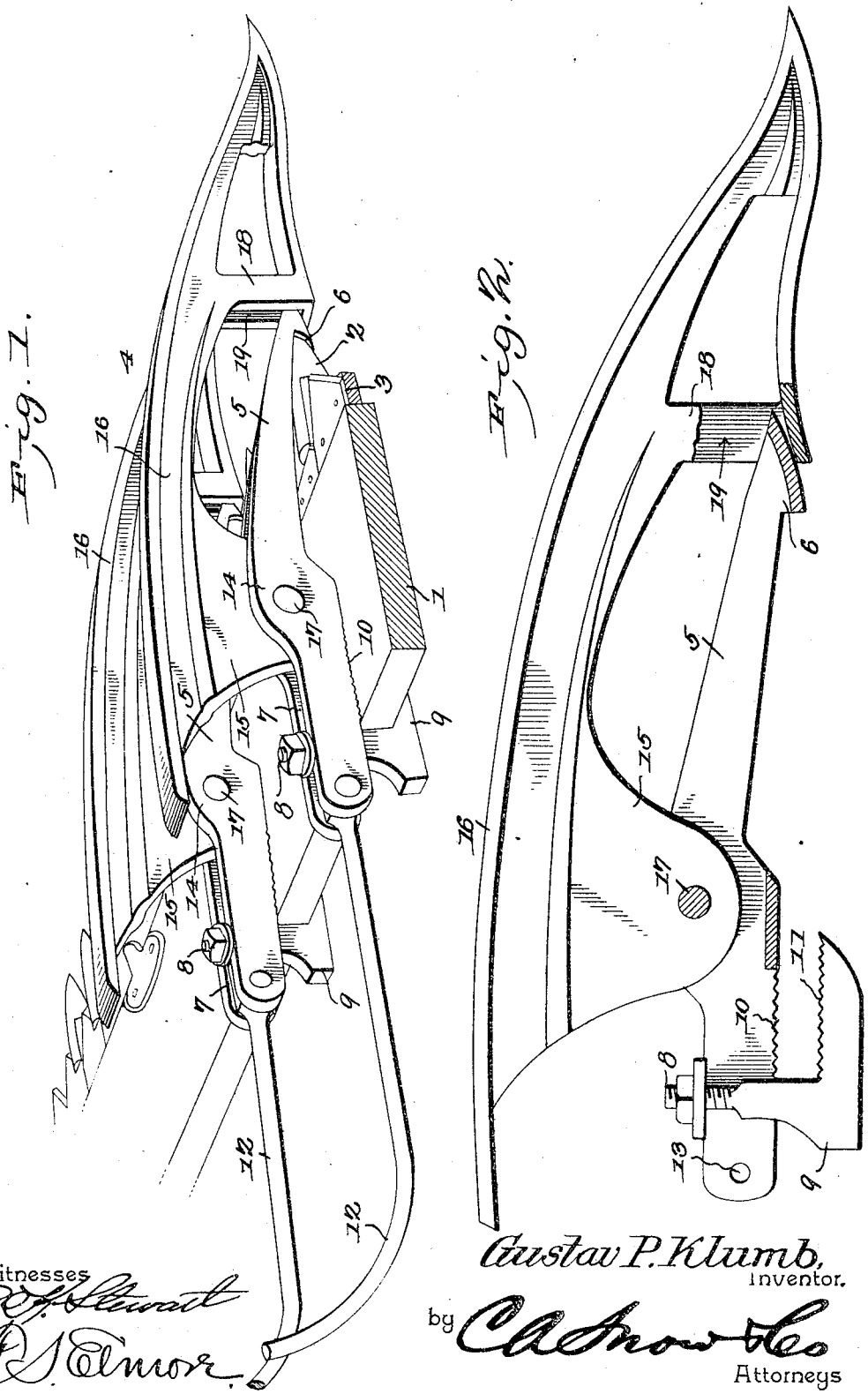

UNITED STATES PATENT OFFICE.

GUSTAV PAUL KLUMB, OF STURGEON BAY, WISCONSIN.

FINGER-GUARD FOR PEA-HARVESTERS.

SPECIFICATION forming part of Letters Patent No. 784,570, dated March 14, 1905.

Application filed July 5, 1904. Serial No. 215,325.

*To all whom it may concern:*

Be it known that I, GUSTAV PAUL KLUMB, a citizen of the United States, residing at Sturgeon Bay, in the county of Door and State of Wisconsin, have invented a new and useful Finger-Guard for Pea-Harvesters, of which the following is a specification.

My invention relates to finger-guards for pea-harvesters, and has for its objects to produce a comparatively simple inexpensive device of this character which may be readily attached to the finger-bar and one wherein the vine-lifting guard will readily conform to irregularities in the ground-surface and will elevate the vines a uniform height under all conditions and carry them wholly over the finger-bar, thereby preventing clogging of the fingers.

To these ends the invention comprises the novel features of construction and combination of parts more fully hereinafter described.

In the accompanying drawings, Figure 1 is a perspective view of a portion of a harvester, showing my invention applied thereto. Fig. 2 is a detail perspective view of the improved finger-guard removed.

Referring to the drawings, 1 designates the finger-bar of a harvester having horizontal fingers 2 projecting forwardly therefrom to receive and sustain a longitudinally-reciprocatory cutter or sickle bar 3, these parts being of the usual or any appropriate construction and material, inasmuch as they constitute no part of the present invention.

The finger-guards 4, constituting the subject of the present invention, are identical in construction and operation, and I will therefore describe but one in detail, in which—

5 designates the guard proper provided at its forward pointed end with a socket or seat 6, adapted to receive the forward end of one of the fingers 2 and adjacent to its rear end having a longitudinally-disposed slot 7 for the reception of a bolt 8, which is extended through and carries a clamping member or block 9, designed for engagement with the finger-bar 1 for attaching the device 4 thereto, there being formed upon the lower face of the member or guard 5 throughout the length of the slot 7 a series of transverse teeth 10, which are faced by similar teeth 11, formed upon the adjacent face of the clamping-block 9, whereby the device will be maintained firmly in position upon the finger-bar. It is to be noted in this connection that the block 9 may be adjusted back and forth longitudinally of the member 5 to accord with the width of the bar 1, to which the device is to be attached. The rear end of the guard 5 is bifurcated for the reception of the adjacent end of buncher member or bar 12 and with a transverse opening 13 for the reception of a bolt or other fastening device, by means of which the buncher-bar is secured in place, while between the ends and adjacent to the longitudinal center of the member 5 there is formed a pair of uprising spaced ears or jaws 14, designed to receive between them a depending portion or enlargement 15, formed upon the lifting member or guard 16, which is pivotally and securely attached to the guard 5 by means of a transverse rivet or axle 17, upon which the lifter 16 may oscillate freely in a vertical plane, there being provided upon the lifter 16 at a point in rear of and suitably remote from its forward downwardly-inclined pointed end a vertically-depending portion 18, having a slot or guideway 19 for the reception of the forward end of the guard 5, whereby the oscillatory movement of the lifter 16 will be limited. At this point it is to be observed that the lifter 16 will, owing to its swinging movement, conform readily to surface irregularities and that owing to its fulcrum being disposed adjacent to the transverse center of the bar 1 the vines will be elevated a uniform height thereover irrespective of the position occupied by the forward end of the lifter, and, furthermore, that the vines will be conveyed by the latter wholly over the bar 1 for delivery onto the bunchers 12, thus obviating clogging of the fingers 2 or cutting mechanism. It is further to be noted that through the engagement of the guard 5 at its forward end with the member 16 the pintle 17 will be relieved of lateral strains to which the lifter may in practice be subjected.

From the foregoing it is apparent that I produce a comparatively simple inexpensive device which in practice will efficiently perform its functions to the attainment of the ends in view, it being understood that minor changes in the details of construction herein set forth may be resorted to without departing from the spirit of the invention.

Having thus described the invention, what is claimed is—

1. In a device of the class described, a finger-bar, fingers carried thereby, a finger-guard attached to the bar, and a lifting member pivotally connected with the guard, the fulcrum of the lifting member being disposed adjacent to the transverse center of the bar.

2. In a device of the class described, a finger-bar, a finger carried thereby, a guard having a socket to receive the forward end of the finger, said guard being provided with a longitudinal slot and having its face serrated beneath the latter, a clamping member having serrations facing the serrated face of the guard, an attaching-bolt engaging the clamping member and adjustably disposed in the slot, and a lifting member pivotally connected with the guard.

In testimony that I claim the foregoing as my own I have hereto affixed my signature in the presence of two witnesses.

GUSTAV PAUL KLUMB.

Witnesses:
PETER LEONHARDT,
EDMUND O. KOHLS.